(12) United States Patent
Slavens et al.

(10) Patent No.: US 9,670,797 B2
(45) Date of Patent: Jun. 6, 2017

(54) MODULATED TURBINE VANE COOLING

(71) Applicants: Thomas N. Slavens, Vernon, CT (US); Edward F. Pietraszkiewicz, Southington, CT (US); Thomas J. Martin, East Hampton, CT (US); Mark F. Zelesky, Bolton, CT (US); Steven B. Gautschi, Naugatuck, CT (US); Matthew A. Devore, Cromwell, CT (US); Alexander Staroselsky, Avon, CT (US)

(72) Inventors: Thomas N. Slavens, Vernon, CT (US); Edward F. Pietraszkiewicz, Southington, CT (US); Thomas J. Martin, East Hampton, CT (US); Mark F. Zelesky, Bolton, CT (US); Steven B. Gautschi, Naugatuck, CT (US); Matthew A. Devore, Cromwell, CT (US); Alexander Staroselsky, Avon, CT (US)

(73) Assignee: United Technologies Corporation, Farmington, CT (US)

( * ) Notice: Subject to any disclaimer, the term of this patent is extended or adjusted under 35 U.S.C. 154(b) by 596 days.

(21) Appl. No.: 13/630,681

(22) Filed: Sep. 28, 2012

(65) Prior Publication Data
US 2014/0271101 A1 Sep. 18, 2014

(51) Int. Cl.
*F01D 25/12* (2006.01)
*F01D 5/18* (2006.01)
*F01D 17/16* (2006.01)

(52) U.S. Cl.
CPC ............ *F01D 25/12* (2013.01); *F01D 5/186* (2013.01); *F01D 5/187* (2013.01); *F01D 5/188* (2013.01); *F01D 5/189* (2013.01); *F01D 17/162* (2013.01); *F05D 2260/202* (2013.01); *Y02T 50/673* (2013.01); *Y02T 50/676* (2013.01)

(58) Field of Classification Search
CPC .......... F01D 5/187; F01D 5/188; F01D 5/189; F01D 25/12; F01D 5/186; F01D 17/162; F05D 2260/202; Y02T 50/676; Y02T 50/673
USPC ...................................................... 415/1, 115
See application file for complete search history.

(56) References Cited

U.S. PATENT DOCUMENTS

| | | | | |
|---|---|---|---|---|
| 3,301,526 A | * | 1/1967 | Chamberlain | 415/115 |
| 3,846,041 A | * | 11/1974 | Albani | 416/97 R |
| 4,169,692 A | * | 10/1979 | McDonough et al. | 415/115 |
| 4,378,960 A | * | 4/1983 | Lenz | 415/115 |
| 5,090,866 A | * | 2/1992 | Blair | 415/115 |
| 6,193,465 B1 | * | 2/2001 | Liotta et al. | 416/96 A |
| 6,631,561 B1 | * | 10/2003 | Anding et al. | 29/889.721 |
| 2010/0054915 A1 | * | 3/2010 | Devore et al. | 415/116 |

* cited by examiner

*Primary Examiner* — Dwayne J White
*Assistant Examiner* — Adam W Brown
(74) *Attorney, Agent, or Firm* — O'Shea Getz P.C.

(57) ABSTRACT

A vane structure includes a baffle movably mounted within an aperture, the baffle movable to control a cooling flow between a first cooling cavity and a second cooling cavity.

10 Claims, 7 Drawing Sheets

MODULATED TURBINE VANE COOLING

BACKGROUND

The present disclosure relates to a gas turbine engine, and more particularly to a turbine vane cooling system.

In high performance gas generator applications, highly variable turbine configurations facilitate operations over a wide range of conditions. Traditional methods adjust cooling airflow gross flows to the entire module through a valve arrangement in the turbine cooling flow supply system upstream of the turbine module. While effective, this approach may not accommodate stage cooling changes due to varying work splits between turbine module stages or specific cooling requirements of specific components due to different life failure modes.

SUMMARY

A vane structure for a gas turbine engine according to one disclosed non-limiting embodiment of the present disclosure includes an airfoil section which defines an aperture, a first cooling cavity in communication with the aperture and a second cooling cavity in communication with the aperture, and a baffle movably mounted within the aperture, the baffle movable to control a cooling flow between the first cooling cavity and the second cooling cavity.

In a further embodiment of the foregoing embodiment, the aperture is circular in cross-section. In the alternative or additionally thereto, in the foregoing embodiment the baffle is circular in cross section. In the alternative or additionally thereto, in the foregoing embodiment the baffle is rotatable about an axis of rotation. In the alternative or additionally thereto, in the foregoing embodiment the airfoil section is rotatable about an axis of rotation.

In a further embodiment of any of the foregoing embodiments, the airfoil section is fixed.

In a further embodiment of any of the foregoing embodiments, the airfoil section is rotatable.

In a further embodiment of any of the foregoing embodiments, the second cooling cavity is a convection cooled cavity.

In a further embodiment of any of the foregoing embodiments, the van structure further includes a third cooling cavity which provides a rotor purge feed.

A vane structure for a gas turbine engine according to another disclosed non-limiting embodiment of the present disclosure includes an airfoil section which defines an aperture, the aperture circular in cross-section, and a baffle movably mounted within the aperture, the baffle circular in cross-section.

In a further embodiment of the foregoing embodiment, the vane structure further includes a first cooling cavity in communication with said aperture and a second cooling cavity in communication with said aperture.

In a further embodiment of any of the foregoing embodiments, the first cooling cavity is a film cooled cavity. In the alternative or additionally thereto, in the foregoing embodiment the second cooling cavity is a convection cooled cavity. In the alternative or additionally thereto, the foregoing embodiment includes a third cooling cavity which provides a rotor purge feed.

A method of communicating a cooling airflow according to another disclosed non-limiting embodiment of the present disclosure includes rotating a baffle within an airfoil section of a turbine vane.

In a further embodiment of the foregoing embodiment, the method further includes rotating the airfoil section of the turbine vane.

In a further embodiment of any of the foregoing embodiments, the method further includes distributing a cooling airflow between a film cooled cavity and a convection cooled cavity.

In a further embodiment of any of the foregoing embodiments, the method further includes distributing a cooling airflow 80%-20% between a film cooled cavity and a convection cooled cavity with the baffle.

In a further embodiment of any of the foregoing embodiments, the method further includes distributing a cooling airflow 20%-80% between a film cooled cavity and a convection cooled cavity with the baffle.

In a further embodiment of any of the foregoing embodiments, the method further includes blocking a cooling airflow 20%-80% between a film cooled cavity and a convection cooled cavity with the baffle.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
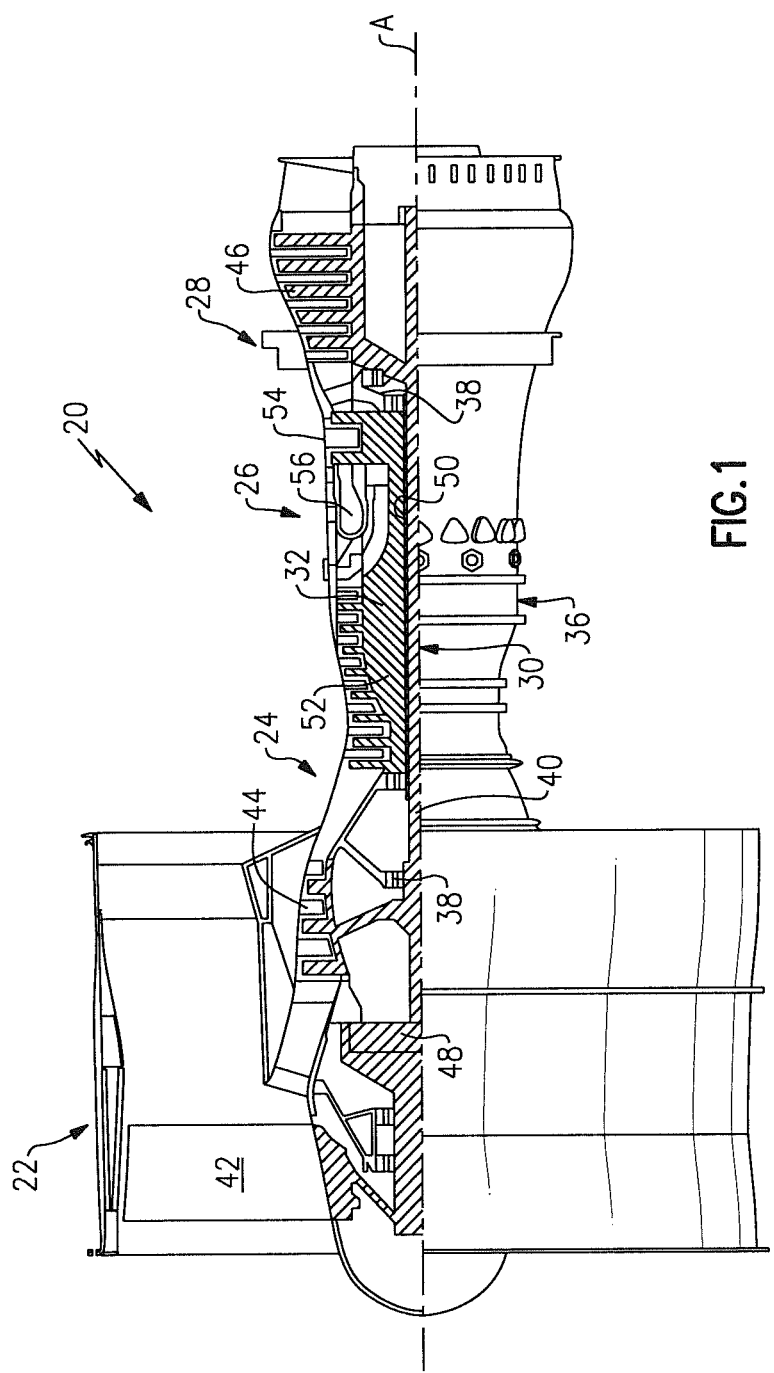
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines such as a three-spool (plus fan) engine wherein an intermediate spool includes an intermediate pressure compressor (IPC) between the LPC and HPC and an intermediate pressure turbine (IPT) between the HPT and LPT.

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor 44 ("LPC") and a low pressure turbine 46 ("LPT"). The inner shaft 40 drives the fan 42 through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") and high pressure turbine 54 ("HPT"). A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the low pressure compressor 44 then the high pressure compressor 52, mixed with the fuel and burned in the combustor 56, then expanded over the high pressure turbine 54 and low pressure turbine 46. The turbines 54, 46 rotationally drive the respective low spool 30 and high spool 32 in response to the expansion.

The main engine shafts 40, 50 are supported at a plurality of points by bearing structures 38 within the static structure 36. It should be understood that various bearing systems 38 at various locations may alternatively or additionally be provided.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds which can increase the operational efficiency of the low pressure compressor 44 and low pressure turbine 46 and render increased pressure in a fewer number of stages.

A pressure ratio associated with the low pressure turbine 46 is pressure measured prior to the inlet of the low pressure turbine 46 as related to the pressure at the outlet of the low pressure turbine 46 prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 44, and the low pressure turbine 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("T"/518.7)$^{0.5}$ in which "T" represents the ambient temperature in degrees Rankine. The Low Corrected Fan Tip Speed according to one non-limiting embodiment of the example gas turbine engine 20 is less than about 1150 fps (351 m/s).

Figure 2:
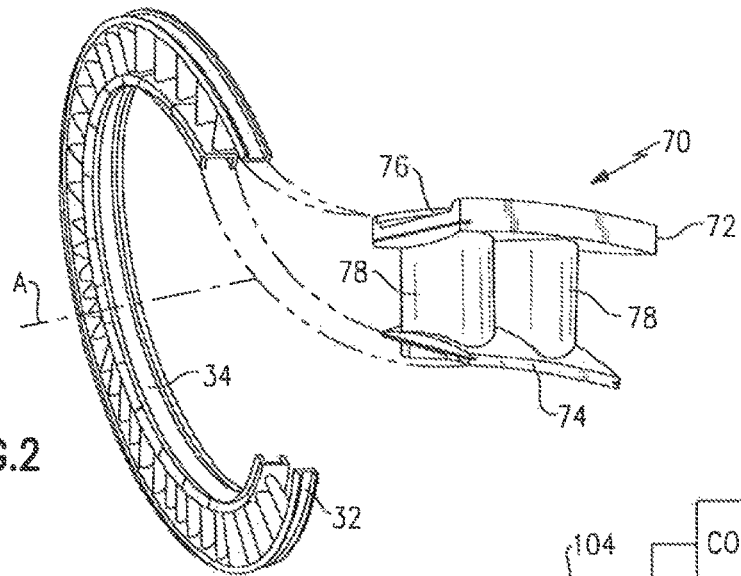
FIG. 2 is a partial exploded view of a vane ring of one turbine stage within a turbine section of the gas turbine engine, the vane ring formed from a multiple of segments.

With reference to FIG. 2, a turbine nozzle segment 70 includes an arcuate outer vane platform segment 72 and an arcuate inner vane platform segment 74 radially spaced apart from each other. The arcuate outer vane platform segment 72 may form a portion of an outer core engine structure and the arcuate inner vane platform segment may form a portion of an inner core engine structure to at least partially define an annular turbine nozzle core airflow flow path (FIG. 3).

The circumferentially adjacent vane platform segments 72, 74 define split lines which thermally uncouple adjacent turbine nozzle segments 70 which may be sealed therebetween, with, for example only, spline seals. That is, the temperature environment of the high pressure turbine 54 and the substantial aerodynamic and thermal loads are accommodated by the plurality of circumferentially adjoining nozzle segments 70 which collectively form a full, annular ring about the centerline axis A of the engine.

Each turbine nozzle segment 70 may include a multiple (two shown) of circumferentially spaced apart airfoil sections 78 which extend radially between the vane platform segments 72, 74. It should be appreciated the any number of vanes may define each segment. Alternatively, the vanes may be formed as a unitary full, annular ring.

Figure 3:
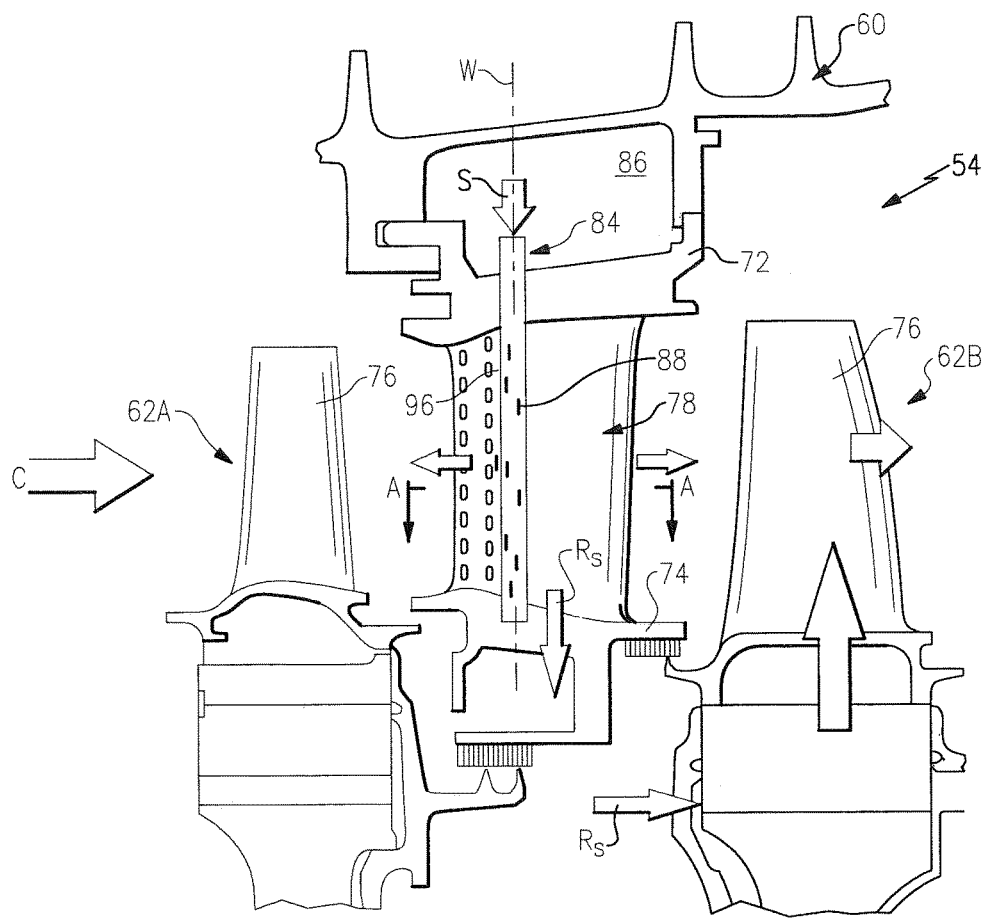
FIG. 3 is a side view of a turbine section.

With reference to FIG. 3, the high pressure turbine 54 generally includes a turbine case 60 with a multiple of turbine stages. The high pressure turbine 54 includes a multiple of rotor structures (two shown; 62A, 62B) interspersed with a vane structure (one shown; 64A). Each of the rotor structures 62A, 62B and the vane structure 64A, include respective airfoil sections 76, 78. It should be appreciated that any number of stages will benefit herefrom and although schematically depicted as the high pressure turbine 54 in the disclosed embodiment, it should also be understood that the concepts described herein are not limited to use with high pressure turbines as the teachings may be applied to other sections such as low pressure turbines, power turbines, intermediate pressure turbines as well as other cooled airfoil structures with any number of stages.

In one disclosed non-limiting embodiment, a baffle 84 is movably mounted through each vane airfoil section 78 and the respective outer vane platform segment 72. The baffle 84 is in fluid communication with a secondary airflow source S which originates from the compressor section 24—illustrated schematically from compartment 86. As defined herein the secondary airflow may be any relatively cooler airflow different than a core airflow C. The baffle 84 may terminate in the respective inner vane platform segment 74 to provide support and block a distal end of the baffle 84 such that the secondary airflow is communicated through baffle holes 88 along the length thereof.

Figure 4:
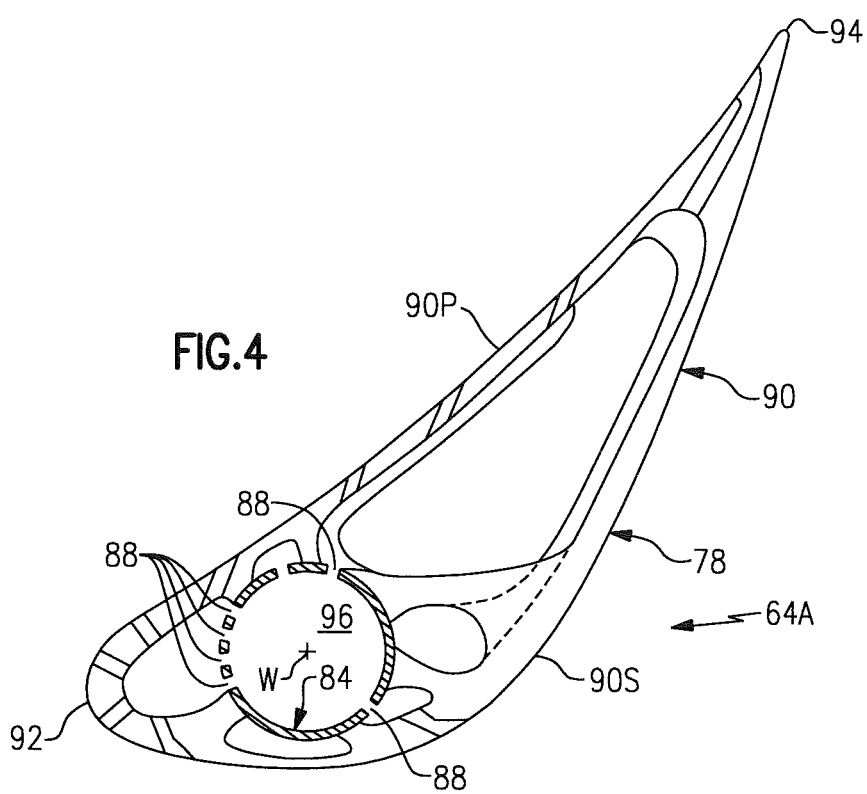
FIG. 4 is a sectional view of a turbine vane taken along line A-A in FIG. 3.

With reference to FIG. 4, each vane airfoil section 78 is defined by an outer airfoil wall surface 90 between the leading edge 92 and a trailing edge 94. The outer airfoil wall surface 90 is typically shaped for use in a respective stage of the high pressure turbine section. The outer airfoil wall surface 90 defines a generally concave shaped portion forming a pressure side 90P and a generally convex shaped portion forming a suction side 90S.

Figure 5:
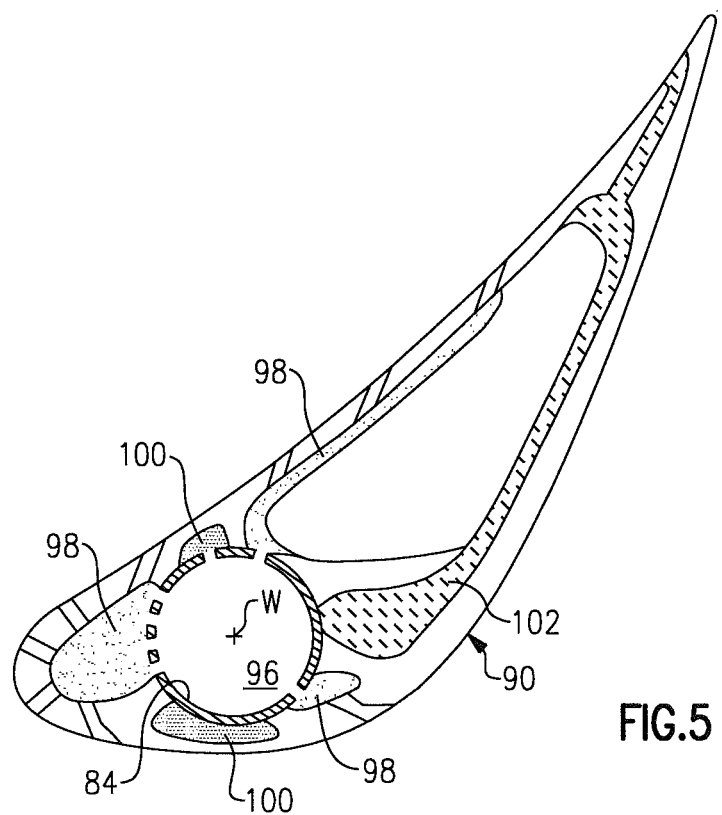
FIG. 5 is a sectional view of the turbine vane of FIG. 4 illustrating various cooling cavities defined therein.

The baffle 84 is located within an aperture 96 which is in fluid communication with a first cooling cavity 98, a second cooling cavity 100 and a third cooling cavity 102 (FIG. 5). The aperture 96 in the disclosed non-limiting embodiment is circular in cross-section to receive the baffle 84 for rotation about axis W. It should be appreciated that other movements of the baffle 84 such as axial sliding along axis W may alternatively or additionally be provided. It should be further appreciated that the cooling cavities 98, 100, 102 may be of various shapes and sizes to communicate the cooling airflow through the outer airfoil wall surface 90.

In the disclosed non-limiting embodiment, the first cooling cavity 98 defines film cooling cavities; the second cooling cavity 100 defines convective cooling and rotor purge feed cavities; and the third cooling cavity 102 defines convective cooling cavities. Additional or alternative cavities may also benefit herefrom. The rotor purge feed cavities of the second cooling cavity 100 communicate cooling airflow through the vane airfoil section 78, the respective inner platform segment 74 and into the downstream rotor 62B (illustrated schematically by arrows Rs); FIG. 3.

Figure 6:
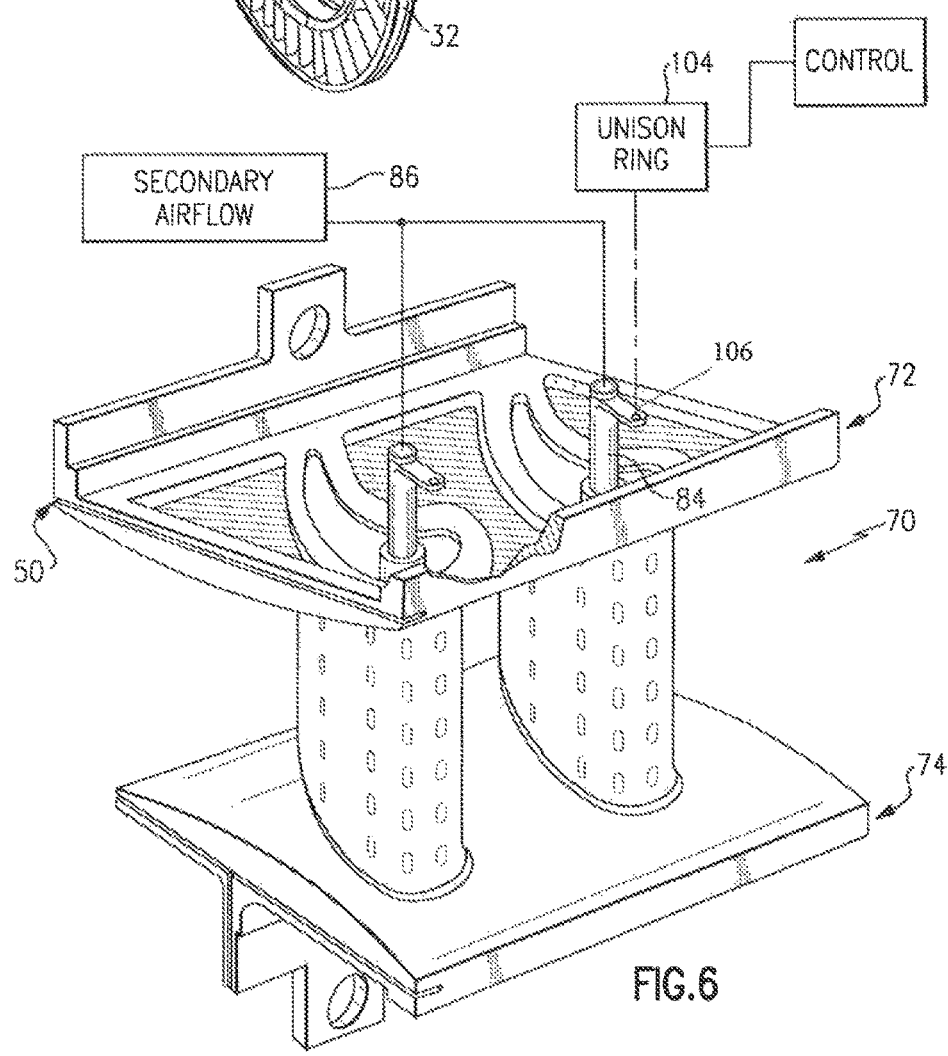
FIG. 6 is a perspective view of a turbine vane segment.
Figure 7:
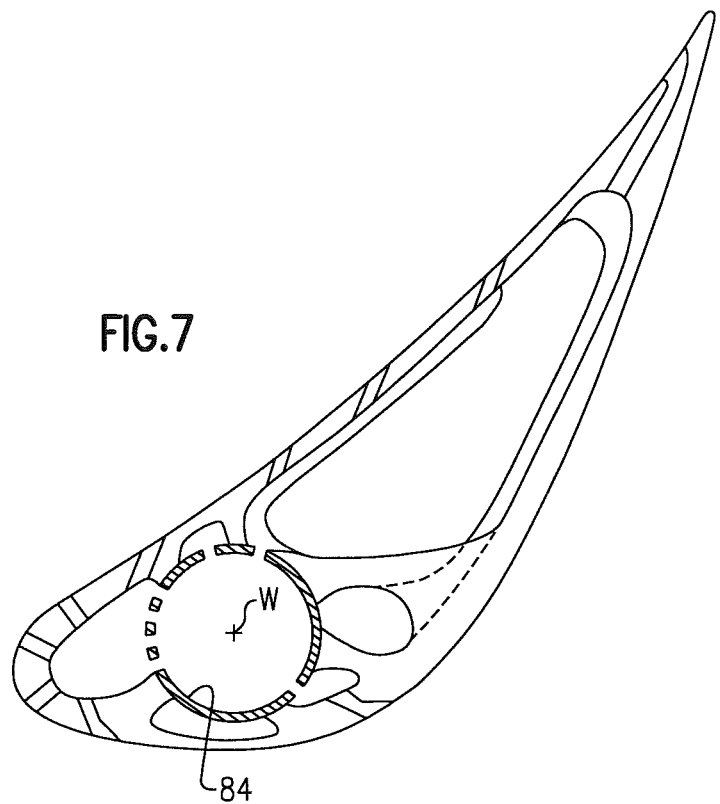
FIG. 7 is a sectional view of the turbine vane of FIG. 4 with a baffle in a first position.
Figure 8:
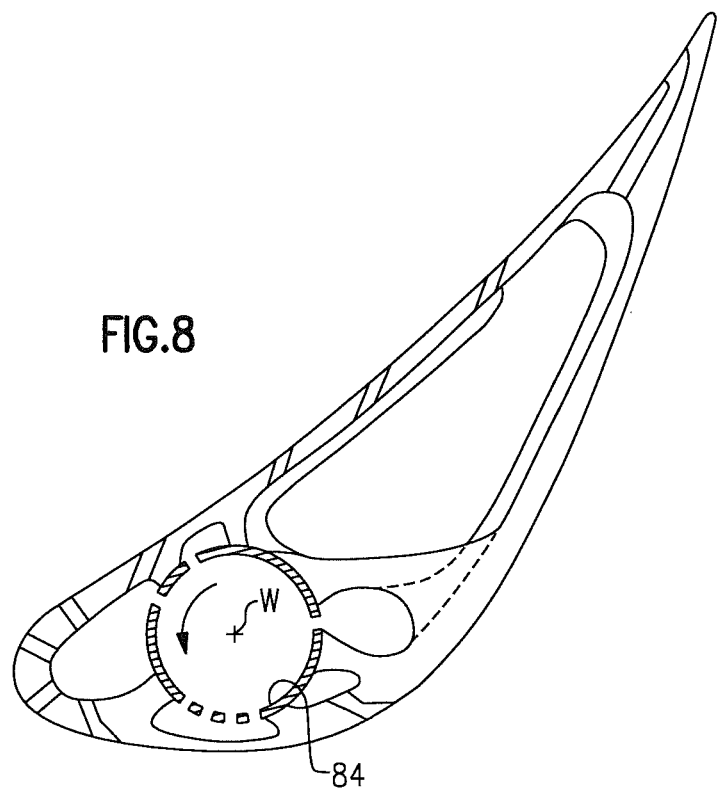
FIG. 8 is a sectional view of the turbine vane of FIG. 4 with the baffle in a second position.
Figure 9:
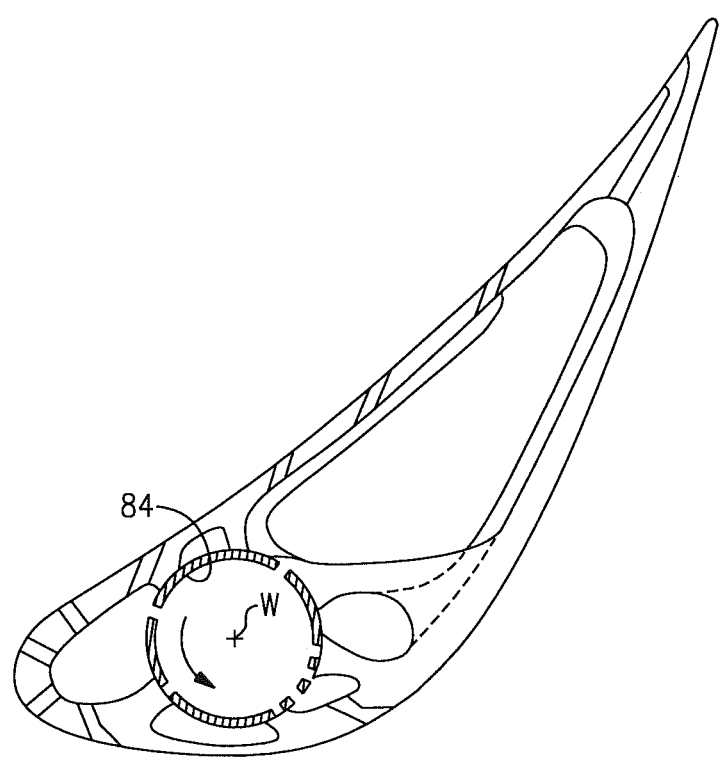
FIG. 9 is a sectional view of the turbine vane of FIG. 4 with the baffle in a third position.

With reference to FIG. 6, an actuator system 104 such as a unison ring (illustrated schematically) rotates an actuator arm 106 and thereby rotates the baffle 84. The actuator system 104 rotates each baffle 84 within the aperture 96 to change the position of the baffle holes 88 to selectively vary cooling modulation from a relatively high flow film cooled scheme (FIG. 7) to a relatively high convectively cooled scheme (FIG. 8). The baffle 84 may also be rotated to essentially minimize or eliminate cooling flow altogether (FIG. 9).

In the disclosed, non-limiting embodiment, the relatively high flow film cooled scheme (FIG. 7) may provide approximately 80% film cooling and 20% convective cooling while the relatively high convectively cooled scheme (FIG. 8) may provide 20% film cooling and 80% convective cooling. It should be appreciated that various arrangements of baffle holes 88 may provide various cooling schemes. The baffle 84 can be articulated such that the baffle holes 88 will deliver primarily blade cooling air, primarily vane cooling air, both vane and blade cooling air, or no cooling air. The ability to modulate cooling airflow facilitates custom tailored parasitic flow to each operating point with specification toward a single component row or collection of rows. That is, the baffle 84 provides a local method of modulating cooling airflow.

The angular position of the baffle 84 relative to axis W dictates which cavities 98, 100, 102 the baffle holes 88 supply. The amount of air drawn out of the baffle 84 may be dependent on the exit conditions of the respective cavity 98, 100, 102, whether the cavity supplies a multiplicity of film holes (FIG. 7) or if the baffle 84 is positioned such that cooling airflow is blocked or directed to low flow areas (FIG. 9).

Figure 10:
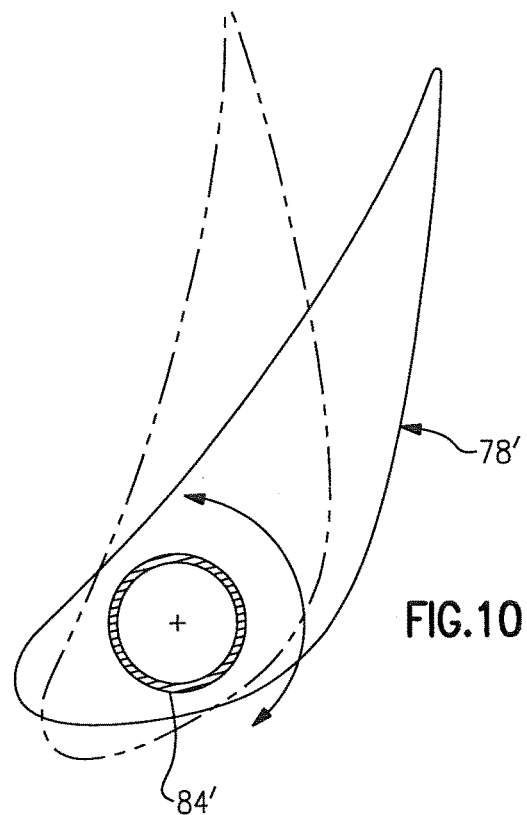
FIG. 10 is a schematic view of a turbine vane with modulated cooling according to another disclosed non-limiting embodiment.

With reference to FIG. 10, another disclosed non-limiting embodiment utilizes a rotationally fixed baffle 84' upon which the vane airfoil section 78' may pivot. That is, the vane airfoil section 78' is a variable vane within which the cooling airflow is selectively communicated to various cavities dependent upon the position of the vane airfoil portion 78' with respect to the baffle 84'.

Figure 11:
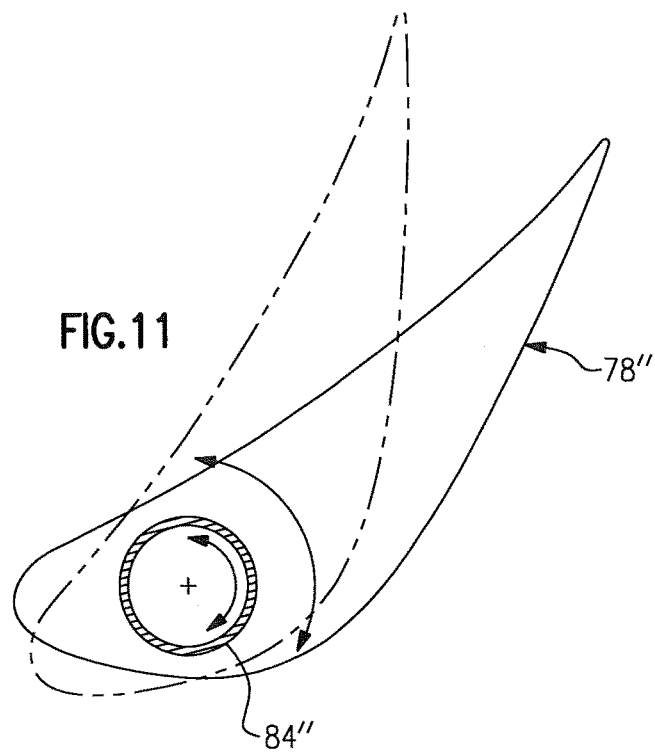
FIG. 11 is a schematic view of a turbine vane with modulated cooling according to another disclosed non-limiting embodiment.

With reference to FIG. 11, another disclosed non-limiting embodiment utilizes a rotational baffle 84" and a rotational vane airfoil section 78". That is, the vane airfoil section 78" is a variable vane and the baffle 84" rotates as described above. The rotational baffle 84" and the rotational vane airfoil section 78" may be actuated through respective unison ring to provide significant controllability such that cooling airflow is selectively communicated to various cavities at various rotational positions of the vane airfoil section 78".

It should be understood that relative positional terms such as "forward," "aft," "upper," "lower," "above," "below," "bottom", "top", and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A vane structure for a gas turbine engine comprising:
   an airfoil section which defines an aperture, said aperture circular in cross-section;
   a baffle movably mounted within said aperture, said baffle circular in cross-section and configured to rotate about an axis;
   a first cooling cavity in communication with said aperture;
   a second cooling cavity in communication with said aperture; and
   a third cooling cavity in communication with said aperture,
   wherein said first cooling cavity defines film cooling cavities,
   wherein said second cooling cavity defines convective cooling and rotor purge feed cavities, and
   wherein said third cooling cavity defines convective cooling cavities.

2. The vane structure as recited in claim 1, wherein said baffle includes a plurality of baffle holes along a length of the baffle and terminates in a vane platform segment to block a distal end of the baffle such that a cooling airflow is configured to be communicated through the plurality of baffle holes.

3. The vane structure as recited in claim 1, further comprising:
   a vane platform segment,
   wherein said baffle terminates in the vane platform segment and includes a plurality of baffle holes along a length of the baffle.

4. A method of communicating a cooling airflow comprising:

rotating a baffle within an aperture of an airfoil section of a turbine vane about an axis, wherein the turbine vane includes:
   a first cooling cavity in communication with said aperture;
   a second cooling cavity in communication with said aperture; and
   a third cooling cavity in communication with said aperture,
wherein said first cooling cavity defines film cooling cavities,
wherein said second cooling cavity defines convective cooling and rotor purge feed cavities, and
wherein said third cooling cavity defines convective cooling cavities.

5. The method as recited in claim 4, further comprising: rotating the airfoil section of the turbine vane.

6. The method as recited in claim 4, further comprising: distributing a cooling airflow between the film cooling cavities and the convective cooling cavities.

7. The method as recited in claim 4, further comprising: distributing a cooling airflow 80%-20% between the film cooling cavities and the convective cooling cavities with the baffle.

8. The method as recited in claim 4, further comprising: distributing a cooling airflow 20%-80% between the film cooling cavities and the convection cooling cavities with the baffle.

9. The method as recited in claim 4, further comprising: blocking a cooling airflow 20%-80% between the film cooling cavities and the convection cooling cavities with the baffle.

10. The method as recited in claim 4, wherein said baffle terminates in a vane platform segment and includes a plurality of baffle holes along a length of the baffle.

\* \* \* \* \*